Oct. 19, 1954     C. A. EMERSON     2,691,933

SOIL PULVERIZER

Filed April 1, 1950

Inventor
Carl A. Emerson
By Fishburn & Mullendore
Attorneys.

Patented Oct. 19, 1954

2,691,933

UNITED STATES PATENT OFFICE 2,691,933

SOIL PULVERIZER

Carl A. Emerson, Kansas City, Mo.

Application April 1, 1950, Serial No. 153,445

1 Claim. (Cl. 97—220)

This invention relates to an agricultural implement, and more particularly to a device for digging and pulverizing the soil preparatory for seeding.

Heretofore devices of this character have generally been used for merely turning of the soil over, such as disk harrows, without pulverizing the same.

The principal objects of the present invention are to provide a device of this character having a power driven shaft upon which are mounted blades or disk cutters, the blades being curved on opposite sides so that the cutting edges are laterally opposite to each other and tend toward alignment with the shaft upon which they are mounted so that when the shaft is rotated the principal body portion of the blades enters the soil in substantially a straight line; to mount the blades upon the shaft so that the edges of two of the blades will be turned towards each other to dig into the soil and turn it entirely over and pulverize it while the opposite edges of the blades are turned away from each other; to provide the blade with saw teeth having arrowhead points to facilitate digging and pulverizing of the soil; to mount the points on the saw or serrated teeth so that they will enter the soil in substantially a straight line or vertical position; to provide a pivotal frame mounting for the disk shaft; to provide suitable mounting of said frame to a mobile structure which may be trailed behind a tractor or the like; to provide for driving of the shaft upon which the blades are mounted independently of the vehicle; to provide hydraulic means for raising and lowering the shaft upon which the cutting blades are mounted and to regulate cutting depth of the blades; to provide a guard over the cutting blades and to provide a device of this character simple, economical to manufacture and efficient in operation.

In accomplishing these and other objects of the present invention, I have provided improved details of structure, the preferred forms of which are illustrated in the accompanying drawings, wherein:

Fig. 1 is a perspective view of my farm implement shown attached to a tractor or the like.

Figure 1:
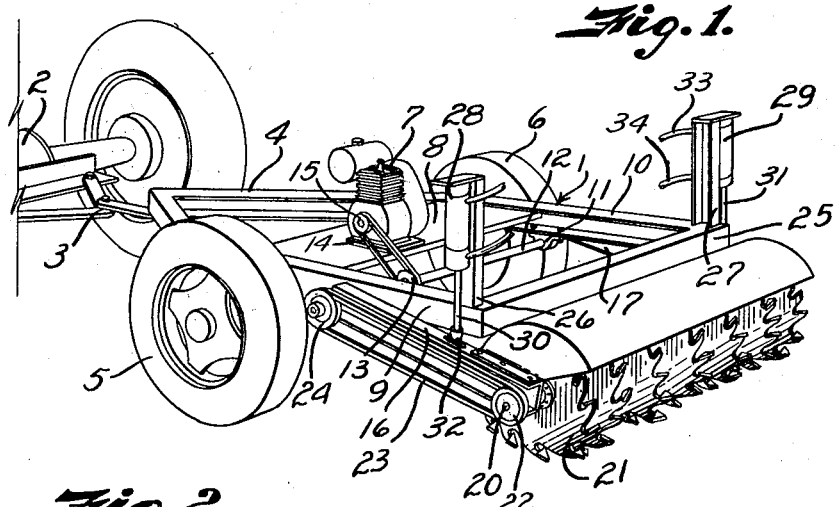

Referring more in detail to the drawings:

1 designates a farm implement embodying the features of my invention shown attached to a tractor or the like 2 by a coupling 3, carried by a framework 4 of a wheel borne structure as indicated by wheels 5 and 6. A motor 7 is mounted upon a platform 8 of the frame. The frame 4 of the movable vehicle includes rearwardly extending rails 9 and 10 and secured to the underneath sides of the rail by bearing brackets or the like 11 is a shaft 12 upon which is mounted a pulley 13 to accommodate a belt 14 running to a pulley 15 on the motor 7. The shaft 12 extends outwardly of the rails 9 and 10 and pivotally mounted thereon are arms 16 and 17 extending rearwardly of the frame of the vehicle.

Mounted in the rear end of the arms 16 and 17 by bolts or the like 18 are bearing members 19 provided with bushings 19' for a shaft 20 upon which the cutting blades 21 are mounted. Mounted upon the outer ends of the shaft 20 are pulleys 22 over which belts 23 run to pulleys 24 mounted on the outer ends of the shaft 12 carried by the frame of the vehicle.

A cross bar 25 is secured to the rear ends of the frame rails 9 and 10 and mounted on the ends of the rails and cross bar are standards 26 and 27 upon which are mounted cylinders 28 and 29 having piston rods 30 and 31 extending downwardly therefrom having their ends pivotally attached to the arms 16 and 17 by brackets or the like 32. Fluid is supplied to the cylinders from a source (not shown) through tubes 33 on one side of the piston in the cylinder and released therefrom through tubes 34 on the opposite side of the cylinder.

The blades 21 are centrally bored and provided with bearing collars 35 and 36 which are secured to said blade by means of rivets 36', the bearing 35 being threadedly bored and adapted to receive a set screw 37 for holding the blades in place on the shaft 20.

Figure 3:
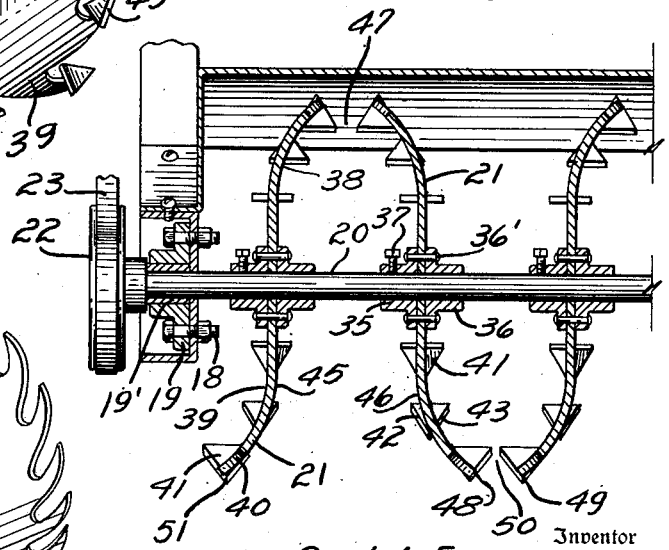
Fig. 3 is a longitudinal cross section through a part of the supporting frame for the blades and through some of said blades.

The blades 21 are curved laterally on one side as indicated at 38 and the opposite side turns laterally in the opposite direction as indicated at 39 (Fig. 3). The portions of the blades between the laterally turned portions remain substantially straight. The blades are provided with saw teeth 40 and preferably provided with arrow point or radially extending penetrating working points 41 having cutting surfaces 42 and 43 on the opposite sides, the points or cutting knives being secured to the blades by brazing or other suitable means.

Figure 4:
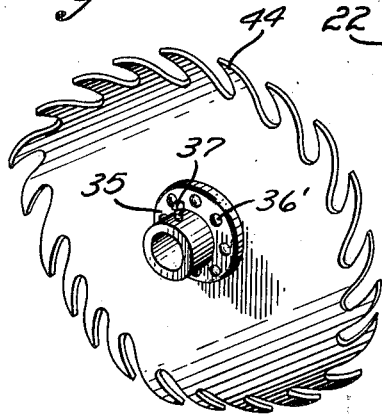
Fig. 4 is a perspective view of one of the blades shown with ordinary saw teeth.

In Fig. 4 I have shown a blade of the same shape except they are provided with saw teeth as indicated at 44 without the arrowhead points.

It will be noted that the blades 21 are arranged in pairs on the shaft 20; for instance, the first pair of blades 45 and 46 have one side of the blades turned inwardly towards each other and the opposite sides outwardly away from each other, so that the point on one side of the shaft will converge or approximate each other as indicated at 47 (Fig. 3), while the point 48 of the blade 46 will approximate the blade 49 of the next pair as indicated at 50 so that the earth between the pairs of blades 45 and 46 as well as that between the blade 46 and 49 will be dug up and completely pulverized. The points of the pairs of blades may be offset on the shaft 20 in order that the points of pairs of blades will not engage the ground at the same time so that there will be a continuous smooth pull on the shaft doing the rotation of the shaft. Any number of pairs may be placed on the shaft as desired contingent upon the size of tools to be used. The blades are of such shape and set on the shaft so that the cutting edges enter the soil in a curved line while the body enters in a straight line.

In operation of a device constructed and assembled as described when the mobile vehicle is pulled through the field by the tractor or the like 2, the motor 7 is operated to rotate the shaft 20 through the belts 23 on each side of the framework structure so that the cutting blades will be rotated by operation of an independent motor instead of through driving connection to the wheels of the vehicle. The depth of the cutting blades is regulated by the hydraulic cylinders mounted on the frame and when the machine is transported and not in operation the cylinders are operated to raise the arms 16 and 17 and the cutting tool off the ground.

Figure 2:
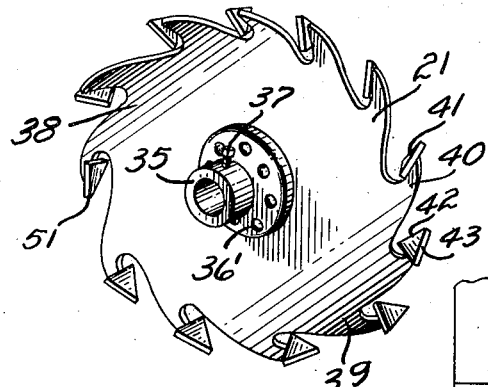
Fig. 2 is a perspective view of one of the cutting blades with arrow teeth.

The arrow points 41 on the saw teeth of the cutting blade are so arranged that when the blade contacts the ground, the arrow heads go into the ground in a straight position as indicated at 51, Fig. 2, so as to alleviate strain on the cutting blade.

It will be obvious from the foregoing that I have provided an improved earth cutting device which digs up the earth and pulverizes it, leaving the surface of the ground in a comparatively smooth condition ready for seeding.

What I claim and desire to secure by Letters Patent is:

In a soil pulverizer having a rotatable shaft, spaced pairs of driven soil pulverizing disks having serrated teeth around the peripheries thereof, the disks being fixed on the shaft whereby said disks have a common axis of rotation, the disks of each pair being spaced from each other a distance substantially equal to the spacing between adjacent pairs, the axis of said shaft being perpendicular to the plane of the principal portions of said disks whereby said portions of the disks enter the soil in a straight line to loosen the soil, the edges of one side of a pair of disks being turned laterally inwardly toward each other and the opposite edges of said pair being turned laterally in the opposite direction so that the laterally inwardly turned side edges of the pair of disks enter the soil at an angle and are substantially close together forming a pocket and the soil is picked up by both disks and pulverized by said disks upon rotation of the shaft, said pairs of disks being staggered on said shaft so that said pockets will be offset with relation to each other around said shaft, and cutter blades secured to the serrated teeth of said disks, the blades on the principal portion of the disks being set in a straight line and the blades on the laterally turned edges of the disks being offset so that the points of all of said blades enter the soil in a straight line.

References Cited in the file of this patent

UNITED STATES PATENTS

| Number | Name | Date |
|---|---|---|
| 570,828 | Tracy | Nov. 3, 1896 |
| 674,658 | Steele | May 21, 1901 |
| 1,635,612 | Dick et al. | July 12, 1927 |
| 1,805,865 | Benzel | May 19, 1931 |
| 2,046,046 | Washington | June 30, 1936 |
| 2,503,993 | Blomgren | Apr. 11, 1950 |
| 2,574,772 | Zorn | Nov. 13, 1951 |